US011292368B2

(12) United States Patent
Behrens (10) Patent No.: US 11,292,368 B2
(45) Date of Patent: Apr. 5, 2022

(54) FRAME FOR A VEHICLE SEAT AS WELL AS A VEHICLE SEAT

(71) Applicant: FAURECIA AUTOSITZE GMBH, Stadthagen (DE)

(72) Inventor: Meinhard Behrens, Wiedensahl (DE)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 140 days.

(21) Appl. No.: 16/788,348

(22) Filed: Feb. 12, 2020

(65) Prior Publication Data
US 2020/0262320 A1 Aug. 20, 2020

(30) Foreign Application Priority Data
Feb. 15, 2019 (DE) ..................... 10 2019 103 915.0

(51) Int. Cl.
*B60N 2/16* (2006.01)
*B60N 2/68* (2006.01)

(52) U.S. Cl.
CPC ........... *B60N 2/1615* (2013.01); *B60N 2/166* (2013.01); *B60N 2/68* (2013.01)

(58) Field of Classification Search
CPC .......... B60N 2/16; B60N 2/161; B60N 2/165; B60N 2/166; B60N 2/1615; B60N 2/42; B60N 2/4263
See application file for complete search history.

(56) References Cited

U.S. PATENT DOCUMENTS

| 4,128,225 | A | * | 12/1978 | Kluting | ................ | B60N 2/1615 |
| | | | | | | 248/421 |
| 6,382,706 | B2 | * | 5/2002 | Yuge | ........................ | B60J 5/106 |
| | | | | | | 296/106 |
| 6,425,557 | B1 | * | 7/2002 | Becker | ..................... | B60N 2/06 |
| | | | | | | 248/157 |
| 8,616,636 | B2 | | 12/2013 | Arata | | |
| 10,300,813 | B2 | * | 5/2019 | Kim | ....................... | B60N 2/165 |
| 10,710,477 | B2 | * | 7/2020 | Yun | ...................... | B60N 2/0232 |
| 2009/0152433 | A1 | * | 6/2009 | Choi | .................... | B60N 2/1635 |
| | | | | | | 248/421 |
| 2012/0248840 | A1 | * | 10/2012 | Becker | ................... | B60N 2/168 |
| | | | | | | 297/344.1 |
| 2016/0176325 | A1 | | 6/2016 | Fujita | | |
| 2020/0001749 | A1 | * | 1/2020 | Cieslak | ............... | B60N 2/1615 |

FOREIGN PATENT DOCUMENTS

| DE | 10042851 A1 | 3/2002 | | |
| DE | 102011001638 A1 | 10/2012 | | |
| DE | 102016001564 A1 | * 8/2017 | ............ | B60N 2/165 |
| DE | 202019101906 U1 | 4/2019 | | |
| EP | 1813465 A2 | * 8/2007 | .......... | B60N 2/4249 |
| EP | 1813465 A2 | 8/2007 | | |

\* cited by examiner

*Primary Examiner* — Ryan D Kwiecinski
(74) *Attorney, Agent, or Firm* — Barnes & Thornburg LLP (57) ABSTRACT

A frame for a vehicle seat comprises two side parts and swing arms pivotable in relation thereto for height adjustment of the frame. The swiveling of the swing arms can be caused by operating two actuator arms. Each actuator arm is associated with another swing arm so that the associated swing arm can be swiveled by actuating the respective actuator arm.

18 Claims, 5 Drawing Sheets

FRAME FOR A VEHICLE SEAT AS WELL AS A VEHICLE SEAT

PRIORITY CLAIM

This application claims priority to German Application No. DE 10 2019 103 915.0, filed Feb. 15, 2019, which is expressly incorporated by reference herein.

BACKGROUND

The present disclosure relates to a frame, and particularly to a frame for a vehicle seat. More particularly, the present disclosure relates to a vehicle seat including a frame.

SUMMARY

According to the present disclosure, a frame as well as a vehicle seat enables a simple and secure height adjustment as well as a secure operation in the event of a crash even under high load.

In illustrative embodiments, a frame for a vehicle seat comprises two side parts and swing arms pivoting in relation to the side parts, to provide at least two actuator arms, each actuator arm being associated with another swing arm of the frame so that the associated swing arm can be swiveled by actuating the respective actuator arm and a height adjustment can be attained thereby.

In illustrative embodiments, the actuation of the at least two actuator arms is synchronized along a direction of actuation via a synchronization bar which extends between the side parts and is rotatably affixed to the side parts at connection points, whereby the connection points are located at most one third of a side part length of the respective side part away from a front end point of the respective side part in a front end region of the respective side part.

In illustrative embodiments, the synchronization bar enables various functions:

Firstly, an adjustment of the swing arms at least in pairs is attained in that the synchronization bar acts on both actuator arms in such a way that the movement of the two actuator arms is coordinated. This provides that swiveling one of the swing arms on one side of the vehicle seat or, respectively, of the frame does not have to be transferred to the other side via a connecting pipe. Rather, the swing arms on both sides are pivoted directly upon actuation via the actuator arms. In order to avoid, in doing so, uneven adjustment of both sides of the frame or, respectively, of the side parts, the actuator arms whose actuation adjusts the swing arms are synchronized in their movement.

This measure alone provides the transfer of forces into the side parts of the frame when performing a height adjustment because the force is introduced into the side parts at two points. This can simplify the height adjustment or, respectively, allow it to be carried out with reduced loss of power, providing better comfort for the occupant because the height adjustment can be carried out more smoothly overall. Then, there is no need for any transfer of force via a connecting bar of the frame or, respectively, this transfer of force can be markedly minimized. This also allows manufacturing cost to be m minimized because the stability of the connecting bar can be designed differently. Moreover, in the event of a crash there will be an optimized transfer of forces from the frame to the actuator arms because, in this case, the force can be deflected on both sides via two actuator arms.

The positioning of the synchronization bar, according to the present disclosure, on the side parts in the anterior third allows forces, in the case of a lateral impact, to be purposefully absorbed by the synchronization bar and also be deflected via the synchronization bar, for example into the respective opposite side part. Thereby, it is possible to omit a front connecting pipe usually extending between the front swing arms in the front end region of the frame because its function can be taken over by the synchronization bar. Thus, the synchronization bar can fulfil a double function.

Secondarily, the synchronization bar can also be constructed such that by virtue of its torsional stiffness purposeful path to force ratios can be set so that, in the event of a crash, a purposeful bio-mechanical motion sequence of the frame or, respectively, of the vehicle seat can be set.

It may further be provided that the connection points on the respective side part are fixed in such a way that an H point (hip point) of an occupant sitting in the vehicle seat is located at a distance X from the synchronization bar of between 130 mm and 230 mm, preferably between 150 mm and 210 mm, even more preferably between 170 mm and 190 mm, in particular 180 mm, and a distance Z of between 40 mm and 100 mm, preferably between 60 mm and 80 mm, even more preferably between 65 mm and 75 mm, in particular 70 mm.

This positioning of the synchronization bar enables a further safety function, namely minimizing the so-called "submarining" in the event of a crash. Hereby "submarining" occurs when an occupant dives underneath the pelvic restraint belt in a frontal impact. The afore-mentioned X distances or, respectively, Z distances of the synchronization bar from the H point can avoid a downward movement of the occupant due to a frontal impact because the movement of the occupant in that case is directed towards the synchronization bar which absorbs the corresponding forces and virtually blocks movement of the occupant. Thus, any further diving is minimized. Thus, several functions can be realized by the synchronization bar at once, making additional functional elements usually guaranteeing these functions obsolete or allowing them to be constructed simpler.

In illustrative embodiments, it is provided that exactly two actuator arms are provided, each actuator arm being associated with one swing arm, for example, a rear swing arm, of the frame. Thus, one actuator arm is associated with each side of the vehicle seat in the rear, which is also usually adjusted, and at least one swing arm can be purposefully swiveled on each side. In principle, however, it is also possible for the front swing arms—in the alternative or complementary—to the rear swing arms to be actuated via respective actuator arms in a synchronized manner in order to attain the height adjustment. In principle, an actuator arm can also act on the front and the rear swing arm at the same time.

In illustrative embodiments, it is further provided that the swing arms are affixed via the pivot points to an upper rail so as to enable a longitudinal adjustment, whereby the pivot points on the swing arm and the anchor points on the swing arm are spaced apart. Hereby, a suitable transition to a longitudinal adjustment of the vehicle seat as well as a simple actuation of the swing arms can be attained with a low number of components for the height adjustment.

In illustrative embodiments, it is further provided that actuator pinions are rigidly affixed to ends of the synchronization bar and the actuator arms each comprise gears, each actuator pinion meshing with the gear of another actuator arm so that any rotation of the actuator pinion and, therewith, an actuation of the actuator arms happens in synchronized fashion. Thus, a mutual mechanical transmission of the movements of the actuator arms via the synchronization bar is attained in a simple manner which is easy to manufacture with a small number of components and to assemble. If it is desired to swivel more than two swing arms via more than two actuator arms, further actuator pinions are to be mounted on the synchronization bar correspondingly.

In illustrative embodiments, it is further provided that the gears on the actuator arm terminate with a stop on one side or on both sides. This limits movement of the actuator arms so that a height adjustment can be performed only within certain limits. Furthermore, forces may be absorbed additionally, for example, in the event of a crash.

In illustrative embodiments, it is provided that at least one of the actuator arms can be operated directly or indirectly via an actuating device, whereby, to that end, the actuating device directly or indirectly drives the synchronization bar so as to be able to operate the actuator arms in synchronized fashion. Thus, synchronization happens already upon operation and the actuation is directly distributed via the synchronization bar to both sides so that the force can be redistributed immediately.

In illustrative embodiments, it is provided that the actuating device acts, via an additional drive pinion on one of the actuator arms, directly, and the operation of the one actuator arm can be transferred to the other actuator arm via the actuator pinion and the synchronization bar. Thus, the operation can be induced directly into the actuator arm in a simple manner. To that end, it may be provided that the additional drive pinion acts on the gears of the respective actuator arm or on a further gears on the respective actuator arm. This can happen with only little effort so that a simple operation of the actuator arms can be attained.

In illustrative embodiments, it is provided that the actuating device acts on the actuator pinion via an additional drive pinion, whereby the drive pinion interlocks with the actuator pinion and the actuation via the synchronization bar and the actuator pinion can be transferred to the two actuator arms. Hereby, an alternative option for actuation can be specified, whereby, in this case, the actuator arms are operated indirectly via the actuator pinion. This, too, enables a synchronized actuation of the actuator arms with little effort.

In illustrative embodiments, the actuating device can be arranged on the side parts on the inside because the actuator arms and the swing arms are, preferably, also arranged on the inside. As a consequence, no space is required for the actuating device towards the outside.

In illustrative embodiments, it is provided that the actuating device acts directly on the actuator pinion or the synchronization bar and the operation via the synchronization bar and the actuator pinion can be transferred to the two actuator arms. Thus, in a further alternative, the synchronization bar may also be operated directly and, thereby, a synchronized operation of the actuator arms can be carried out, with no further drive pinion being required herefor. Then, the actuating device is to be affixed, for example, on the side part on the outside and can, from there, be operatively connected to the synchronization bar or the actuator pinion in a simple manner. However, an arrangement on the side parts on the inside is also possible.

In illustrative embodiments, the actuating device is operated manually, for example via a pump with an actuator lever, or electrically, for example by means of a motor, whereby the electrical operation can also be carried out in an automated manner.

In illustrative embodiments, a vehicle seat is proposed comprising a frame according to the present disclosure so that the entire vehicle seat can be adjusted in the height adjustment direction by synchronized actuation of the actuator arms.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 2b is a frontal view of the frame according to FIG. 2a;

FIG. 3a is a detailed view of the frame according to FIG. 2a;

DETAILED DESCRIPTION

Figure 1:
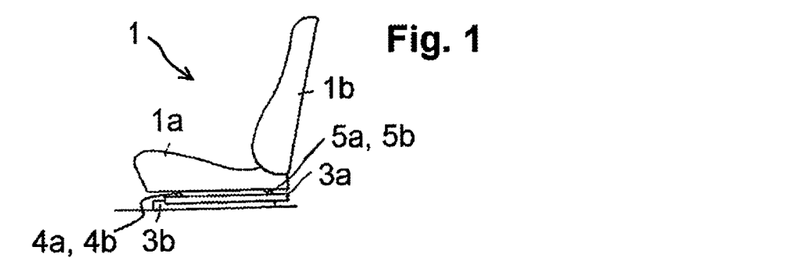
FIG. 1 is a schematic view of a vehicle seat.

According to FIG. 1, a vehicle seat 1 is shown comprising a seat part 1a and a back rest 1b. The vehicle seat 1 is mounted, via upper rails 3a arranged on the left and right sides, on lower rails 3b rigidly affixed to the vehicle floor in a longitudinally adjustable manner to allow for longitudinal adjustment able of the vehicle seat 1. Moreover, the vehicle seat 1 is provided with a height adjustment device. In order to adjust the height of the vehicle seat 1 front swing arms 4a, 4b and rear swing arms 5a, 5b are each provided on the right and left sides which, when adjusted, a frame 2 being part of the seat part 1a can be height adjusted in relation to the upper rail 3a or, respectively, the vehicle floor.

Figure 2A:
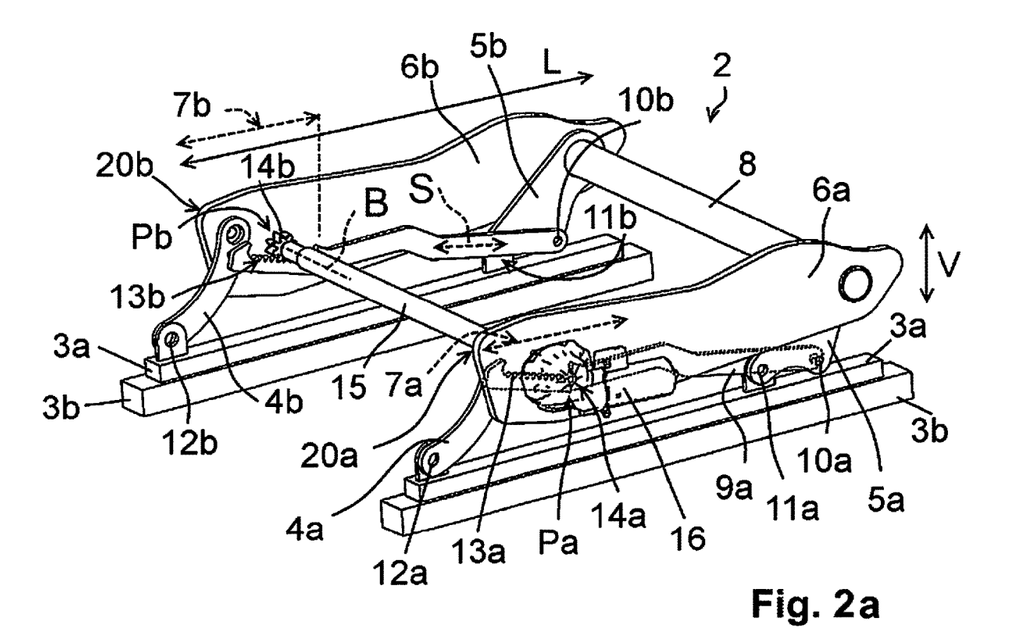
FIG. 2a is a perspective view of a frame of the vehicle seat according to FIG. 1.

To that end, according to FIG. 2a, the frame comprises one side part 6a, 6b each on the right and the left side on which one of the ends of the two front swing arms 4a, 4b are twistable mounted. The respective other ends of the two front swing arms 4a, 4b are twistable mounted on the upper rail 3a. The two rear swing arms 5a, 5b are twistable mounted on the upper rail 3a and also twistable in relation to the side parts 6a, 6b. Thus, any swiveling of the swing arms 4a, 4b, 5a, 5b causes lifting or lowering of the frame 2 or, respectively, of the side parts 6a, 6b in relation to the upper rail 3a as follows:

The side parts 6a, 6b are connected to each other via a rear connecting pipe 8, in order to determine, in particular, the position of the side parts 6a, 6b relative to each other. The rear connecting pipe 8 is firmly attached to the side parts 6a, 6b, and the rear swing arms 5a, 5b are twistable attached on the right and left sides to the read connecting pipe 8 or otherwise twistable arranged thereon so that the rear swing arms 5a, 5b can rotate relative to the rear connecting pipe 8. Alternatively, the rear connecting pipe 8 may be rigidly connected to the rear swing arms 5a, 5b and twistable mounted on the side parts 6a, 6b. In both cases it will be achieved that the side parts 6a, 6b or, respectively, the entire frame 2 is adjusted in height when the rear swing arms 5a, 5b are swiveled.

In this arrangement, the height adjustment emanates from the swing arms 5a, 5b which, as will be illustrated later, can be purposefully adjusted to achieve a height adjustment. The front swing arms 4a, 4b swivel along automatically via the rotating connecting to the side parts 6a, 6b and on the upper rail 3a thereby determining the movement of the frame 2 in the front region so that an even lifting or, respectively, lowering of the vehicle seat 1 can be attained.

In this embodiment of the present disclosure, a connection of the front swing arms 4a, 4b via a connecting pipe is not provided. Rather, the side parts 6a, 6b are connected in the front region via a synchronization bar 15 to be described later.

Figure 5:
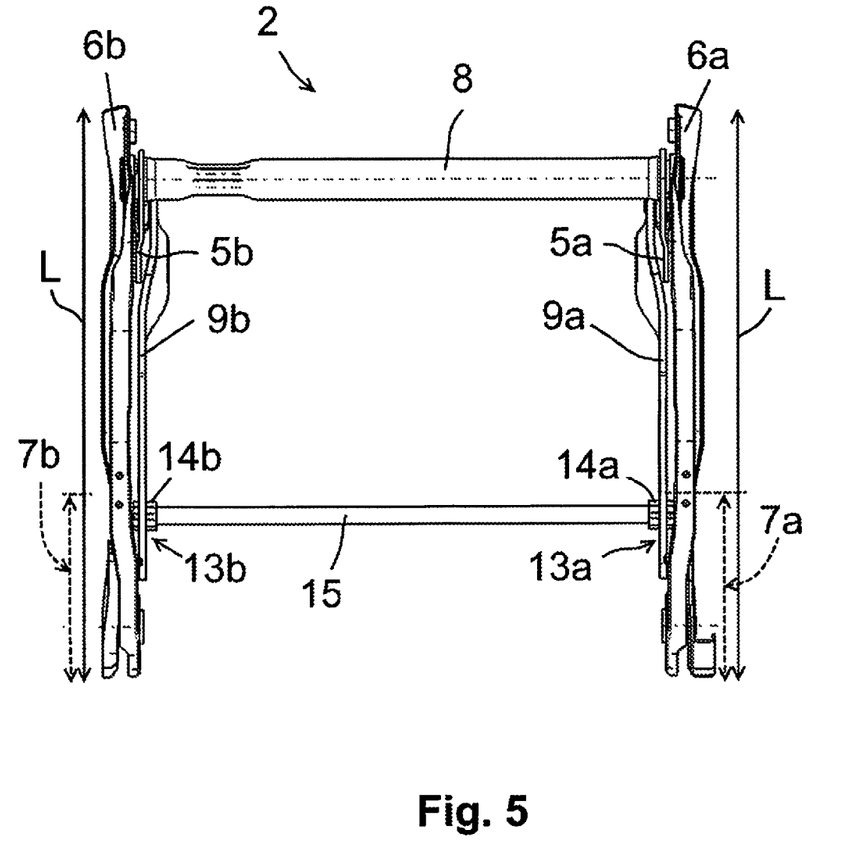
FIG. 5 is a top view on the frame according to FIG. 1.

The actuation or, respectively, the active swiveling of the rea swing arms 5a, 5b is attained via actuator arms 9a, 9b arranged on the right and left sides, whereby each side of the vehicle seat 1 is associated with its own actuator arm 9a, 9b. This is shown, additionally, in FIG. 5 in a top view. Thus, an adjustment of the read swing arms 5a, 5b and, therewith, a height adjustment of the vehicle seat 1 is provided substantially, not only by unilateral interaction with one of the rear swing arms 5a, 5b, but through bilateral interaction with each of the rear swing arms 5a, 5b. This avoids a unilaterally induced height adjustment of the motor vehicle seat 1, thereby improving the overall transmission of force and the handling for height adjustment. In the event of a crash, too, the transmission of force to the rear swing arms 5a, 5b as well as the actuator arms 9a, 9b will be bilateral so that the forces acting on one actuator arm 9a, 9b will be reduced.

For the purpose of swiveling the rear swing arms 5a, 5b the actuator arms 9a, 9b are rotating connected, each on one end via an anchor point 10a, 10b, to the rear swing arm 5a, 5b so that upon adjustment of the actuator arms 9a, 9b along a direction of actuation S the respective rear swing arm 5a, 5b swivels about a rear pivot point 11a, 11b which lies on the upper rail 3a. Swiveling about the respective rear pivot point 11a, 11b moves the side parts 6a, 6b, by means of the rear swing arms 5a, 5b rotating mounted thereon, upwards or, respectively, downwards in a height adjustment direction V, as it is usual in a height adjustment of a vehicle seat 1. Hereby, the movement of the side parts 6a, 6b is determined at the front side via the front swing arms 4a, 4b which, in this case, each rotate about their front pivot points 12a, 12b on the upper rail 3a.

For the purpose of adjusting the actuator arms 9a, 9b along the direction of actuation S, the actuator arms 9a, 9b according to this embodiment example each comprise gears 13a, 13b in their end regions each interlocking with an actuator pinion 14a, 14b. The ends of the actuator pinion 14a, 14b are each arranged on the synchronization bar 15 so that the actuator pinion 14a, 14b rotated in a manner synchronized with each other. Thus, via the synchronization bar 15 it is achieved that the actuator arms 9a, 9b, too, move along the direction of actuation S in synchronized fashion when the synchronization bar 15 or, respectively, one of the actuator pinions 14a, 14b is driven directly or indirectly in any manner. Thereby, the rear swing arms 5a, 5b, too, are adjusted in synchronized fashion so that any differences in height adjustment of the two side parts 6a, 6b can be minimized.

Figure 3A:
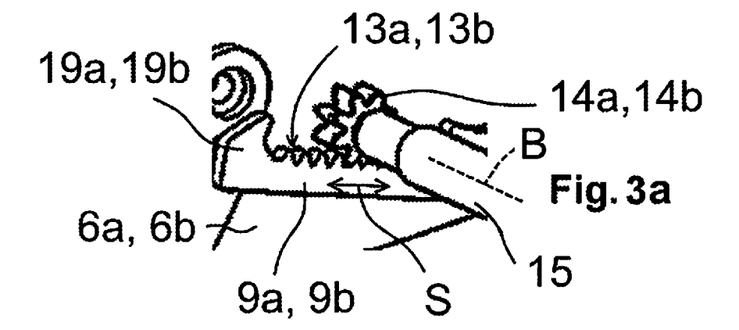

The coaction of the respective actuator pinion 14a, 14b together with the respective gears 13a, 13b of the actuator arms 9a, 9b is shown in FIG. 3a in a detailed view for one side of the frame 2. Thus, the elongated gears 13a, 13b interlock from below with the respective actuator pinion 14a, 14b, as a result of which the respective actuator arm 9a, 9b is adjusted upon rotation of the actuator pinion 14a, 14b in the respective direction of actuation S so that the side parts 6a, 6b or, respectively, the frame 2 or, respectively, the vehicle seat 1 can be adjusted in height via swiveling of the rear swing arms 5a, 5b. In an alternative embodiment, shown in FIG. 3b, the respective actuator arm 9a, 9b may be arranged above the respective actuator pinion 14a, 14b so that the gears 13a, 13b touches the actuator pinions 14a, 14b from above and, thereby, a rotational movement of the synchronization bar 15 is converted into an actuation movement of the actuator arms 9a, 9b along the direction of actuation S.

Figure 3B:
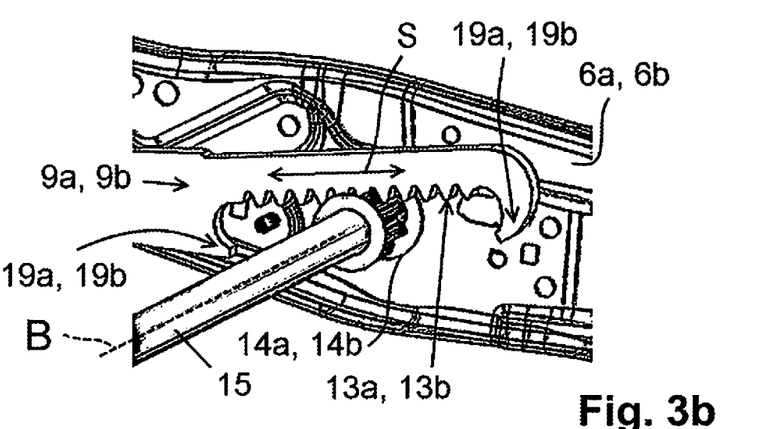
FIG. 3b is a detailed view of a frame in an alternative embodiment.

Each actuator arm 9a, 9b still comprises, both in FIG. 3a as well as in FIG. 3b, a stop 19a, 19b at one of the two or both sides of the gears 13a, 13b which makes sure that the actuator arm 9a, 9b can be adjusted only within a certain range along the direction of actuation S. Thus, the actuator pinion 14a, 14b interlocking with the gears 13a, 13b can be moved only in a certain range between the stops 19a, 19b along the actuator arm 9a, 9b. This determines to what extent the vehicle seat 1 can be adjusted upwards or, respectively, downwards. Moreover, this defines a stop in the event of a crash beyond which the vehicle seat 1 cannot be adjusted. This acts both on the right and on the left side so that the forces from both rear swing arms 5a, 5b can be absorbed.

By virtue of a synchronized operation on the right and left side of the rear swing arms 5a, 5b via the two actuator arms 9a, 9b, it is possible to distribute the force in a suitable manner to the rear swing arms 5a, 5b, whereby a transmission of force between the two sides no longer happens via the rear connecting pipe 8 but is introduced directly into the two rear swing arms 5a, 5b. Thus, the rear connecting pipe 8 can be manufactured with an overall reduced rigidity leading to reduced manufacturing cost. Moreover, the adjustment will be simplified overall.

Because, according to this embodiment, there will be no front connecting pipe between the front swing arms 4a, 4b, important functions otherwise fulfilled by such a connecting pipe must be realized by other means. In order to handle this, the synchronization bar 15, which, as described above, takes care of a synchronization of the two sides of the frame 2 during seat height adjustment, is designed accordingly and pivotally mounted and within the frame 2 on pre-determined connection points Pa, Pb on side parts 6a, 6b.

As can be seen in FIG. 2a, the connection points Pa, Pb are chosen such that the synchronization bar 15 is pivotally mounted on the side parts 6a, 6b each in a front end region 7a, 7b. Hereby, the front end region 7a, 7b preferably covers the region in the front third of the respective side part 6a, 6b. Thus, starting from a front end point 20a, 20b of the respective side part 6a, 6b, the connection points Pa, Pb lie at a maximum of one third of the length L of the side part away from the front end point 20a, 20b.

This positioning of the synchronization bar 15 allows it to fulfill further functions besides synchronizing the swiveling motion of the rear swing arms 5a, 5b.

Firstly, the synchronization bar 15 can purposefully absorb forces and deflect them into the side parts 6a, 6b. Hereby, the connection points Pa, Pb are determined, in particular, in such a way that, in the event of a side impact, forces acting on the side parts 6a, 6b can be deflected purposefully and efficiently via the synchronization bar 15 into the frame 2. Thus, vehicle seat may be maximized.

Figure 2B:
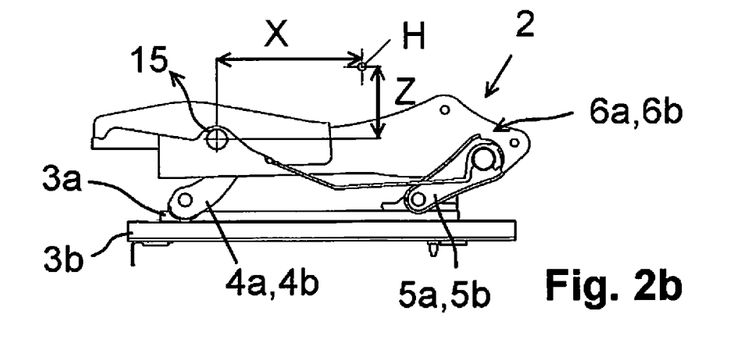

Furthermore, the connection points Pa, Pb are determined such that, according to FIG. 2b, a hip point (H point) of an occupant sitting in the vehicle seat 1 is arranged at a certain distance or, respectively, in a certain relative position to the synchronization bar 15. Thus, a distance X is determined to be approximately between 130 mm and 230 mm, preferably between 150 mm and 210 mm, in particular between 170 mm and 190 mm. A distance Z is determined to be between 40 mm and 100 mm, preferably between 60 mm and 80 mm, in particular between 65 mm and 75 mm.

With the distances X, Z so chosen, in this vehicle seat 1, a so-called submarining, i.e. diving of the occupant underneath the pelvic restraint belt in the event of a frontal crash, can be minimized, whereby, to minimized submarining an X distance X of about 180 mm and a Z distance Z of about 70 mm has turned out to be particularly advantageous. With these distances X, Z a downwards movement of the occupant due to a front crash is blocked because the movement of the occupant in that case is directed towards the synchronization bar 15 which absorbs these forces. Further diving is thus minimized. Thus, by virtue of such a positioning of the synchronization bar 15, a further safety aspect can be realized.

Moreover, due to the torsional stiffness of the synchronization bar 15, purposeful path to force ratios with a precisely tuned characteristic of the vehicle seat 1 in the event of a crash can be set. Thereby, it is possible to purposefully pre-determine bio-mechanical motion sequences of the vehicle seat 1 in the event of a crash. Thus, in total, using the synchronization bar 15, a multiplicity of functions can be realized while maximizing the safety and also the scope of operation of the vehicle seat 1.

The synchronization of both sides is achieved, as described, via the synchronization bar 15 which must be driven accordingly in order to adjust the seat height. The FIGS. 4a through 4d show various drive concepts herefor, whereby in each drive concept only a unilateral drive via a corresponding actuating device 16 is provided. Via the synchronization bar 15 the drive motion is transmitted accordingly also to the other side of the vehicle seat 1 or, respectively, to the other actuator arm 9a, 9b.

Figure 4A:
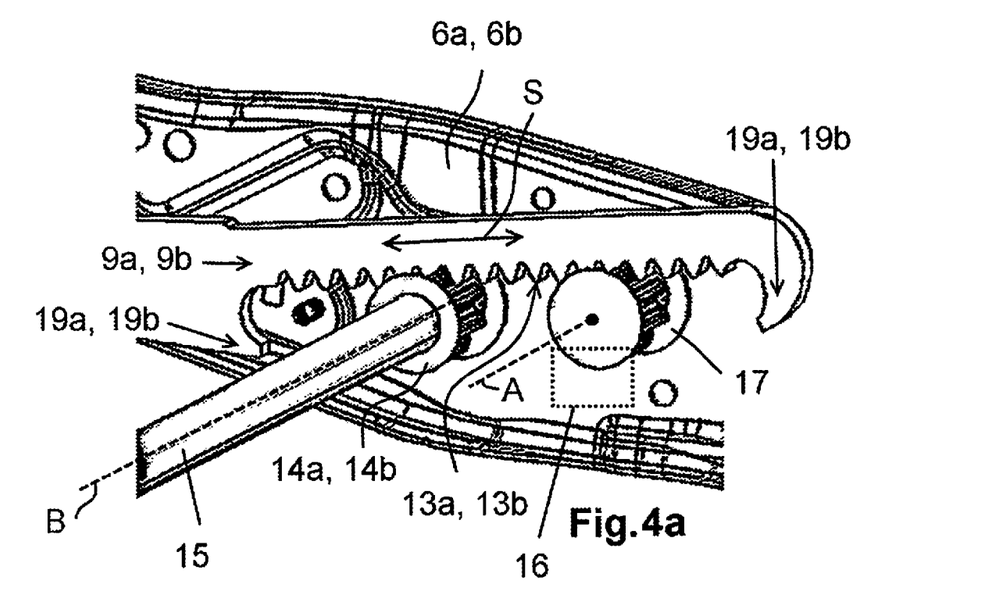
FIG. 4a-d are different actuating concepts for height adjustment of the vehicle seat according to FIG. 1.

Thus, according to FIG. 4a, it is provided that the gears 13a, 13b of the actuator arm 9, 9b is designed in extended form on one side of the frame 2 compared to the detailed image in FIG. 3b. In addition to the actuator pinion 14a, 14b a further actuator pinion 17 is provided which also interlocks with the gears 13a, 13b of the respective actuator arm 9a, 9b. The drive pinion 17 co-acts with a corresponding actuating device 16 which drives the drive pinion 17 about a drive axis A. In this embodiment, a synchronizing axis B is arranged separate from the drive axis A. In an analog manner, this can also be provided for the mirrored embodiment in FIG. 3a, whereby the gears 13a, 13b then interlock on one side of the frame 2 from below both on the actuator pinion 14a, 14b and the drive pinion 17.

In the Figures the actuating device 16 is shown schematically. It may be provided as a manual or as an electrically operated actuating device 16. As a manual actuating device 16, for example, a pump can be utilized which is operated by the occupant via an operating lever, not shown, in the manner of a pump. This operation in the manner of a pump rotates the drive pinion 17 about the drive axis A. An electric actuating device 16 may comprise, for example, an electric motor which, when controlled accordingly, takes care in a suitable manner for rotating the drive pinion 17 about the drive axis A.

The drive pinion 17 then takes care of the respective actuator arm 9a, 9b being adjusted along the direction of actuation S. Via the actuator pinion 14a, 14b and the synchronization bar 15 this drive motion is transferred also to the other actuator arm 9a, 9b on the other side of the frame 2. Thus, the two rear swing arms 5a, 5b can be swiveled in synchronized fashion thereby adjusting the vehicle seat 1 in its height. Herefor, merely an actuating device 16 is used.

Figure 4B:
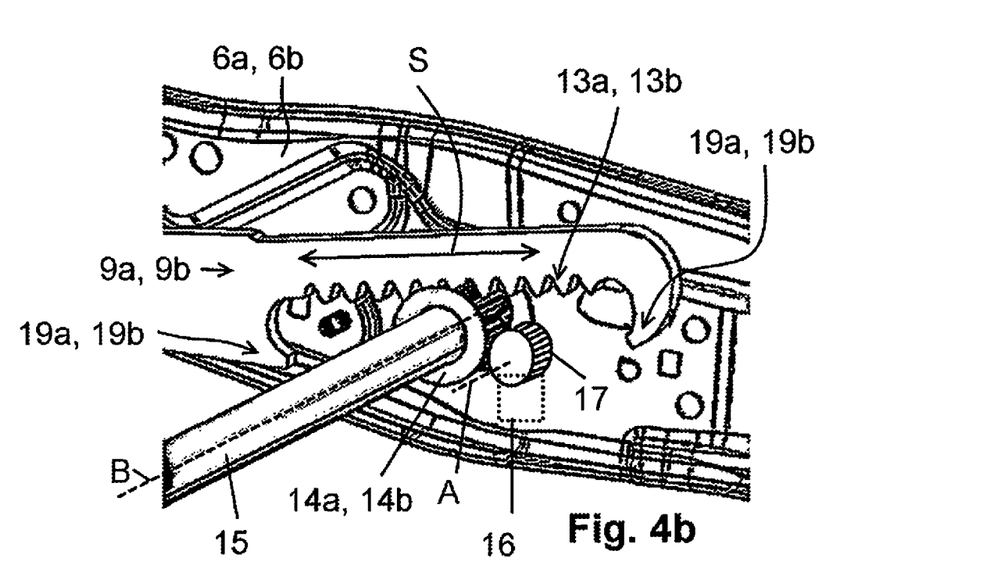

In contrast to the FIG. 4a, according to the embodiment example in FIG. 4b, it is provided that the gears 13a, 13b are designed shorter again, and the drive pinion 17 does not interlock with the gears 13a, 13b of the one actuator arm 9a, 9b. Rather, the drive pinion 17 directly co-acts with the respective actuator pinion 14a, 14b driving this. Thus, the drive pinion 17 is driven via a manual or electric actuating device 16, and this rotations movement is directly transferred accordingly to the actuator pinion 14a, 14b and, via this, to the synchronization bar 15 and the actuator arms 9a, 9b so as to reach the height adjustment of the vehicle seat 1 as described before. In this embodiment example, too, the drive axis A is arranged separate from the synchronization axis B. This embodiment example, too, can be transferred, in analog fashion, to the gears 13a, 13b touching the actuator pinion 14a, 14b from below, according to FIG. 3a.

Figure 4C:
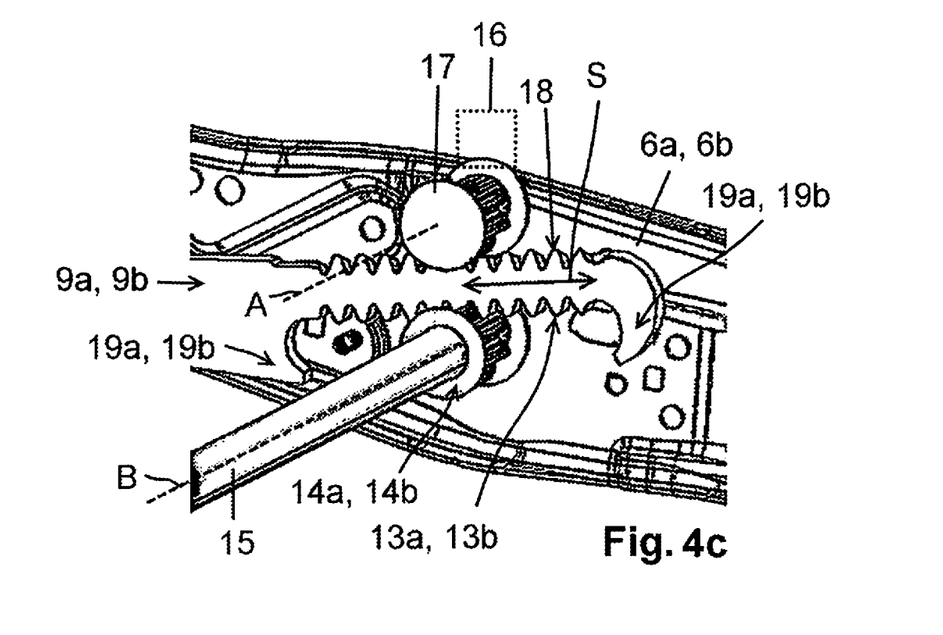

According to the embodiment in FIG. 4c, in addition to the gears 13a, 13b upper gears 18 are arranged on the respective actuator arm 9a, 9b. In this case, the drive pinion 17 interlocks with the upper gears 18 and takes care, via a corresponding actuating device 16, of the actuator arm 9a, 9b being adjusted along the direction of actuation S. Via the synchronization bar 15 the drive movement induced by the drive pinion 17 into the actuator arm 9a, 9b, as described in connection with the other embodiment examples, is transferred to the other actuator arm 9a, 9b on the other side of the frame 2 or, respectively, of the vehicle seat 1 so that in this embodiment example, too, merely a unilateral operation takes place. This embodiment example, too, can be designed in mirrored form, similar to FIG. 3a.

Figure 4D:
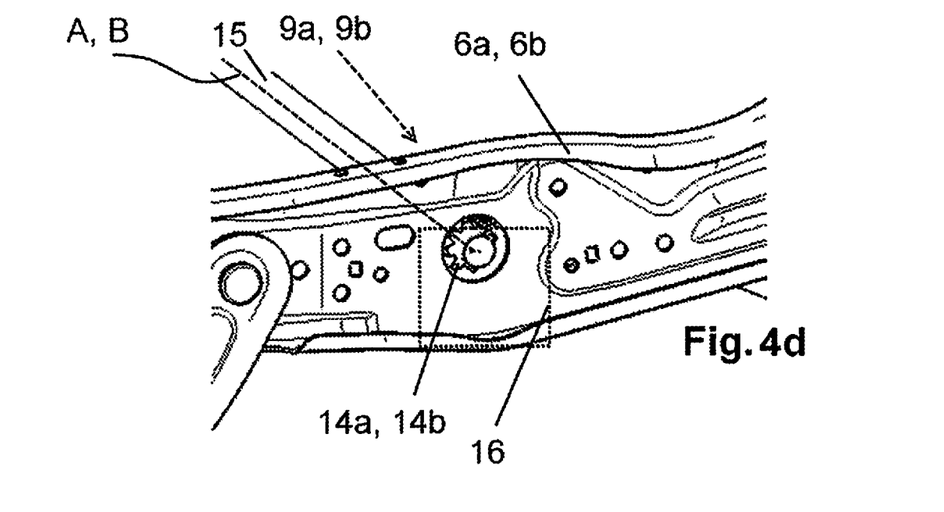

In the embodiment example according to FIG. 4d it is provided that the drive axis A and the synchronization axis B coincide. Thus, using the corresponding actuating device 16, the actuator pinion 14a, 14b or, respectively, the synchronization bar 15 is driven directly in an analog manner. To that end, the actuating device 16 is attached, for example, from outside to the respective actuator pinion 14a, 14b or, respectively, unilaterally to the synchronization bar 15, and the synchronization bar 15 or, respectively, the actuator pinion 14a, 14b is driven directly. The actuating device 16 must then accordingly be affixed to the respective side part 6a, 6b from outside in order to be able to cause rotation of the synchronization bar 15. Via this, too, the two actuator arms 9a, 9b are adjusted along the direction of actuation S, and s height adjustment of the vehicle seat 1 can be attained. Hereby, the gears 13a, 13b may touch the respective actuator pinion 14a, 14b from below (FIG. 3a) or from above (FIG. 3b).

Vehicle seats may be provided, in addition to a longitudinal adjustment, also with a height adjustment. To that end, the vehicle seat comprises, as part of a frame, several pivoting swing arms via which the entire frame can be purposefully adjusted upwards or downwards, for example, in relation to a longitudinally adjustable upper rail. To that end, the pivoting swing arms are each supported on both sides—on the upper rail upper rail and on side parts of the frame. To perform a height adjustment, usually, one of the two rear swing arms arranged on the left or right side is pivoted via an actuator arm, whereby the actuator arm can be adjusted by an actuating device, for example a pump. The swing arm so pivoted initially provides for a unilateral lifting of the frame in the rear of the vehicle seat.

In order to transfer this adjustment motion also to the other swing arms the pivoted rear swing arm is rigidly connected to the rear swing arm on the other side via a rear connecting pipe of the frame. Thus, the swivel movement is transferred via the rear connecting pipe to the other rear swing arm or, respectively, to the other side of the vehicle seat or, respectively, of the frame. The front swing arms limit the movement of the frame in the front which is also raised by the side parts of the frame so that the vehicle seat can be evenly raised or lowered.

Hereby, it is a disadvantage that the rear connecting pipe transfers the entire force from the one rear swing arm to the other side of the frame. This impairs the height adjustment because the forces are transferred via the one rear swing arm into the entire frame. Moreover, the rear connecting pipe may be manufactured with corresponding stability so as to avoid torsion in the event of strong forces. In the event of a crash, too, the entire force is transferred via the rear connecting pipe to the one rear swing arm or, respectively, the actuator arm being in operative connection therewith.

In one example, a height adjustable frame has rear swing arms which are swiveled by means of two synchronized actuator arms. Thereby, a transfer of forces does no longer happen merely via the rear perpendicular pipe between the rear swing arms. The actuation of the swing arms can be synchronized by means of a synchronization bar. In this frame design, it is not possible to provide for a secure or predictable transfer of forces, in particular lateral forces, in the front area of the frame as well as a secure reception of an occupant in the event of a crash.

The invention claimed is:

1. A frame for a vehicle seat comprising
two side parts and swing arms pivoting in relation to the side parts, said frame being height adjustable by means of swiveling the swing arms, whereby said swiveling of the swing arms can be caused by operating at least two actuator arms,
each actuator arm being associated with a respective swing arm of the frame so that the respective swing arm can be swiveled by actuation of a respective actuator arm, said at least two actuator arms being twistable mounted at an anchor point to the respective swing arm so that, upon actuation of said at least two actuator arms along a direction of actuation, the swing arms can be swiveled about a pivot point and the side parts of the frame can be moved in a height adjustment direction,
the actuation of said at least two actuator arms along the direction of actuation being synchronized via a synchronization bar so that the swing arms swivel in synchronized fashion, said synchronization bar extending between said side parts and being twistable mounted at connection points on the side parts,
wherein said connection points are located at most one third of a side part length of each respective side part away from a front end point of the respective side part in a front end region of the respective side part, and
wherein said swing arms includes front swing arms that are twistable arranged in the front end region of the respective side part, said front swing arms arranged on different side parts and not being connected to each other via a transverse pipe.

2. The frame of claim 1, wherein, outside the front end region, said swing arms further include rear swing arms that are twistable arranged on the respective side part, said rear swing arms on different side parts being connected to each other via a rear transverse pipe.

3. The frame of claim 2, wherein said connection points on the respective side part are fixed in such a way that a hip point of an occupant sitting in the vehicle seat is located at a horizontal distance from said synchronization bar of between 130 mm and 230 mm and a vertical distance from said synchronization bar of between 40 mm and 100 mm.

4. The frame of claim 3, wherein exactly two actuator arms are provided, each actuator arm being associated with one swing arm of the frame.

5. The frame of claim 4, wherein said swing arms are affixed via the pivot points to an upper rail.

6. The frame of claim 5, wherein the pivot points on each swing arm and the anchor points on each swing arm are spaced apart.

7. The frame of claim 3, wherein said horizontal distance is between 150 mm and 210 mm and said vertical distance is between 60 mm and 80 mm.

8. The frame of claim 7, wherein said horizontal distance is between 170 mm and 190 mm and said vertical distance is between 65 mm and 75 mm.

9. The frame of claim 8, wherein said horizontal distance is 180 mm and said vertical distance is 70 mm.

10. A frame for a vehicle seat comprising
two side parts, two swing arms mounted for pivotable movement relative to the side parts, said frame being height adjustable in response to pivotable movement of the swing arms, and at least two actuator arms,
each actuator arm being associated with a respective swing arm of the frame so that the respective swing arm can be pivoted by actuation of each respective actuator arm, said at least two actuator arms being twistable mounted at an anchor point to the respective swing arm so that, upon actuation of said at least two actuator arms along a direction of actuation, the swing arms can be swiveled about a pivot point and the side parts of the frame can be moved in a height adjustment direction,
the actuation of said at least two actuator arms along the direction of actuation being synchronized via a synchronization bar so that the swing arms swivel in synchronized fashion, said synchronization bar extending between said side parts and being twistable mounted at connection points on the respective side parts,
wherein said connection points are located at most one third of a side part length of the respective side part away from a front end point of the respective side part in a front end region of the respective side part, and
wherein actuator pinions are rigidly affixed to ends of the synchronization bar, said actuator arms each comprising gears, each actuator pinion meshing with the gears of a respective actuator arm so that any rotation of the actuator pinion and, therewith, an actuation of the actuator arms happens in synchronized fashion.

11. The frame of claim 10, wherein the gears on each actuator arm terminate with a stop on one side or on both sides so as to limit movement of each actuator arm.

12. The frame of claim 11, wherein at least one of the actuator arms can be operated directly or indirectly via an actuating device, said actuating device driving said synchronization bar indirectly or directly for synchronized operation of the actuator arms.

13. The frame of claim 12, wherein said actuating device acts via an additional drive pinion on one of the actuator arms and the operation of the one actuator arm can be transferred to the other actuator arm via the actuator pinion and the synchronization bar.

14. The frame of claim 13, wherein said additional drive pinion acts on the gears of the respective actuator arm or on a further gears on the respective actuator arm for operating the respective actuator arm along the direction of actuation.

15. The frame of claim 12, wherein said actuating device acts directly on the actuator pinion via an additional drive pinion, whereby said drive pinion interlocks with said actuator pinions and the actuation via the synchronization bar and the actuator pinion can be transferred to the two actuator arms.

16. The frame of claim 12, wherein said actuating device acts directly on said actuator pinion or said synchronization bar, and the actuation via said synchronization bar and said actuator pinions can be transferred to the two actuator arms.

17. The frame of claim 16, wherein said actuating device is operated manually or electrically.

18. A vehicle seat comprising the frame of claim 1 for adjusting the vehicle seat in the height adjustment direction by synchronized actuation of the actuator arms.

* * * * *